(12) United States Patent
Wightman

(10) Patent No.: US 6,401,470 B1
(45) Date of Patent: Jun. 11, 2002

(54) EXPANSION DEVICE FOR VAPOR COMPRESSION SYSTEM

(75) Inventor: David A. Wightman, Prospect Heights, IL (US)

(73) Assignee: XDX, LLC, Arlington Heights, IL (US)

(*) Notice: Subject to any disclaimer, the term of this patent is extended or adjusted under 35 U.S.C. 154(b) by 0 days.

(21) Appl. No.: 09/661,477

(22) Filed: Sep. 14, 2000

(51) Int. Cl.⁷ ................................................ F25B 41/04
(52) U.S. Cl. ...................... 62/222; 236/92 B; 236/93 R
(58) Field of Search .......................... 62/222, 223, 224, 62/225; 236/92 B, 93 R

(56) References Cited

U.S. PATENT DOCUMENTS

| | | |
|---|---|---|
| 1,907,885 A | 5/1933 | Shively |
| 2,084,755 A | 6/1937 | Young, Jr. |
| 2,112,039 A | 3/1938 | McLenegan |
| 2,126,364 A | 8/1938 | Witzel |
| 2,164,761 A | 7/1939 | Ashley |
| 2,200,118 A | 5/1940 | Miller |
| 2,229,940 A | 1/1941 | Spofford |
| 2,323,408 A | 7/1943 | Miller |
| 2,467,519 A | 4/1949 | Borghesan |
| 2,471,448 A | 5/1949 | Platon |
| 2,511,565 A | 6/1950 | Carter |
| 2,520,191 A | 8/1950 | Aughey et al. |
| 2,539,062 A | 1/1951 | Dillman |
| 2,547,070 A | 4/1951 | Aughey et al. |
| 2,571,625 A | 10/1951 | Seldon |
| 2,596,036 A | 5/1952 | MacDougall |
| 2,707,868 A | 5/1955 | Goodman |
| 2,755,025 A | 7/1956 | Boles |
| 2,771,092 A | 11/1956 | Schenk |
| 2,856,759 A | 10/1958 | Barbulesco |
| 2,922,292 A | 1/1960 | Lange |
| 2,944,411 A | 7/1960 | McGrath |
| 2,960,845 A | 11/1960 | Lange |
| 3,007,681 A | 11/1961 | Keller |
| 3,014,351 A | 12/1961 | Leimbach |
| 3,060,699 A | 10/1962 | Tilney |
| 3,138,007 A | 6/1964 | Friedman et al. |
| 3,150,498 A | 9/1964 | Blake |

(List continued on next page.)

FOREIGN PATENT DOCUMENTS

| | | |
|---|---|---|
| DE | 197 52 259 A1 | 6/1998 |
| DE | 197 43 734 A1 | 4/1999 |
| EP | 0 355 180 A2 | 2/1990 |
| EP | 0355180 | 2/1990 |
| JP | 58146778 | 9/1983 |
| JP | 03020577 | 1/1991 |
| JP | 10325630 | 8/1998 |
| JP | 10306958 | 11/1998 |
| WO | WO 93/06422 | 4/1993 |
| WO | WO 95/03515 | 2/1995 |
| WO | WO 98/03827 | 1/1998 |
| WO | WO 98/57104 | 12/1998 |

*Primary Examiner*—Teresa Walberg
*Assistant Examiner*—Fadi H. Dahbour
(74) *Attorney, Agent, or Firm*—Brinks Hofer Gilson & Lione

(57) ABSTRACT

A vapor compression system including a line for flowing heat transfer fluid, a compressor connected with the line for increasing the pressure and temperature of the heat transfer fluid, a condenser connected with the line for liquefying the heat transfer fluid, and an expansion device connected with the line for expanding the heat transfer fluid. The expansion device includes a housing defining a first orifice, and at least one blade connected with the housing, wherein the blade is movable between a first position and a second position, wherein the first orifice is larger in the first position than in the second position. The vapor compression system also includes an evaporator connected with the line for transferring heat from ambient surroundings to the heat transfer fluid.

15 Claims, 5 Drawing Sheets

U.S. PATENT DOCUMENTS

| | | |
|---|---|---|
| 3,194,499 A | 7/1965 | Noakes et al. |
| 3,257,822 A | 6/1966 | Abbott |
| 3,316,731 A | 5/1967 | Quick |
| 3,343,375 A | 9/1967 | Quick |
| 3,392,542 A | 7/1968 | Nussbaum |
| 3,402,566 A | 9/1968 | Leimbach |
| 3,427,819 A | 2/1969 | Seghetti |
| 3,464,226 A | 9/1969 | Kramer |
| 3,520,147 A | 7/1970 | Glackman |
| 3,631,686 A | 1/1972 | Kautz |
| 3,633,378 A | 1/1972 | Toth |
| 3,638,444 A | 2/1972 | Lindahl |
| 3,638,447 A | 2/1972 | Abe |
| 3,683,637 A | 8/1972 | Oshima et al. |
| 3,708,998 A | 1/1973 | Scherer et al. |
| 3,727,423 A | 4/1973 | Nielson |
| 3,785,163 A | 1/1974 | Wagner |
| 3,792,594 A | 2/1974 | Kramer |
| 3,798,920 A | 3/1974 | Morgan |
| 3,822,562 A | 7/1974 | Crosby |
| 3,866,427 A | 2/1975 | Rothmayer et al. |
| 3,921,413 A | 11/1975 | Kohlbeck |
| 3,934,424 A | 1/1976 | Goldsberry |
| 3,934,426 A | 1/1976 | Jespersen et al. |
| 3,948,060 A | 4/1976 | Gaspard |
| 3,965,693 A | 6/1976 | Widdowson |
| 3,967,466 A | 7/1976 | Edwards |
| 3,967,782 A | 7/1976 | Eschbaugh et al. |
| 3,968,660 A | 7/1976 | Amann et al. |
| 3,980,129 A | 9/1976 | Bergdahl |
| 4,003,729 A | 1/1977 | McGrath |
| 4,003,798 A | 1/1977 | McCord |
| 4,006,601 A | 2/1977 | Ballarin et al. |
| 4,103,508 A | 8/1978 | Apple |
| 4,106,691 A | 8/1978 | Nielsen |
| 4,122,686 A | 10/1978 | Lindahl et al. |
| 4,122,688 A | 10/1978 | Mochizuki et al. |
| 4,136,528 A | 1/1979 | Vogel et al. |
| 4,151,722 A | 5/1979 | Willitts et al. |
| 4,159,078 A * | 6/1979 | Diermayer et al. ........ 236/93 R |
| 4,163,373 A | 8/1979 | van der Sluijs |
| 4,167,102 A | 9/1979 | Willitts |
| 4,176,525 A | 12/1979 | Tucker et al. |
| 4,182,133 A | 1/1980 | Haas et al. |
| 4,184,341 A | 1/1980 | Friedman |
| 4,191,326 A * | 3/1980 | Diermayer et al. ........ 236/93 R |
| 4,193,270 A | 3/1980 | Scott |
| 4,207,749 A | 6/1980 | Lavigne, Jr. |
| 4,230,470 A | 10/1980 | Matsuda et al. |
| 4,235,079 A | 11/1980 | Masser |
| 4,245,778 A * | 1/1981 | Diermayer ................ 236/93 R |
| 4,270,362 A | 6/1981 | Lancia et al. |
| 4,285,205 A | 8/1981 | Martin et al. |
| 4,290,480 A | 9/1981 | Sulkowski |
| 4,302,945 A | 12/1981 | Bell |
| 4,328,682 A | 5/1982 | Vana |
| 4,337,892 A * | 7/1982 | Diermayer et al. ....... 236/93 R |
| 4,350,021 A | 9/1982 | Lundstrom |
| 4,398,396 A | 8/1983 | Schmerzler |
| 4,430,866 A | 2/1984 | Willitts |
| 4,451,273 A | 5/1984 | Cheng et al. |
| 4,485,642 A | 12/1984 | Karns |
| 4,493,364 A | 1/1985 | Macriss et al. |
| 4,543,802 A | 10/1985 | Ingelmann et al. |
| 4,583,582 A | 4/1986 | Grossman |
| 4,596,123 A | 6/1986 | Cooperman |
| 4,606,198 A | 8/1986 | Latshaw et al. |
| 4,621,505 A | 11/1986 | Ares et al. |
| 4,633,681 A | 1/1987 | Webber |
| 4,658,596 A | 4/1987 | Kuwahara |
| 4,660,385 A | 4/1987 | Macriss et al. |
| 4,742,694 A | 5/1988 | Yamanaka et al. |
| 4,779,425 A | 10/1988 | Yoshihisa et al. |
| 4,813,474 A | 3/1989 | Umezu |
| 4,848,100 A | 7/1989 | Barthel et al. |
| 4,852,364 A | 8/1989 | Seener et al. |
| 4,854,130 A | 8/1989 | Naruse et al. |
| 4,888,957 A | 12/1989 | Chmielewski |
| 4,938,032 A | 7/1990 | Mudford |
| 4,942,740 A | 7/1990 | Shaw et al. |
| 4,947,655 A | 8/1990 | Shaw |
| 4,955,205 A | 9/1990 | Wilkinson |
| 4,955,207 A | 9/1990 | Mink |
| 4,979,372 A | 12/1990 | Tanaka |
| 4,984,433 A | 1/1991 | Worthington |
| 5,044,551 A * | 9/1991 | Tanaka et al. ............ 236/92 B |
| 5,050,393 A | 9/1991 | Bryant |
| 5,058,388 A | 10/1991 | Shaw et al. |
| 5,062,276 A | 11/1991 | Dudley |
| 5,065,591 A | 11/1991 | Shaw |
| 5,070,707 A | 12/1991 | Ni |
| 5,072,597 A | 12/1991 | Bromley et al. |
| 5,076,068 A | 12/1991 | Mikhail |
| 5,094,598 A | 3/1992 | Amata et al. |
| 5,107,906 A | 4/1992 | Swenson et al. |
| 5,129,234 A | 7/1992 | Alford |
| 5,131,237 A | 7/1992 | Valbjorn |
| 5,168,715 A | 12/1992 | Nakao et al. |
| 5,181,552 A | 1/1993 | Eierman |
| 5,195,331 A | 3/1993 | Zimmern et al. |
| 5,231,845 A | 8/1993 | Sumitani et al. |
| 5,249,433 A | 10/1993 | Hardison et al. |
| 5,251,459 A | 10/1993 | Grass et al. |
| 5,253,482 A | 10/1993 | Murway |
| 5,291,941 A | 3/1994 | Enomoto et al. |
| 5,303,561 A | 4/1994 | Bahel et al. |
| 5,305,610 A | 4/1994 | Bennett et al. |
| 5,309,725 A | 5/1994 | Cayce |
| 5,329,781 A | 7/1994 | Farrey et al. |
| 5,355,323 A | 10/1994 | Bae |
| 5,377,498 A | 1/1995 | Cur et al. |
| 5,408,835 A | 4/1995 | Anderson |
| 5,423,480 A | 6/1995 | Heffner et al. |
| 5,440,894 A | 8/1995 | Schaeffer et al. |
| 5,509,272 A | 4/1996 | Hyde |
| 5,515,695 A | 5/1996 | Sakakibara et al. |
| 5,520,004 A | 5/1996 | Jones, III |
| 5,544,809 A | 8/1996 | Keating et al. |
| 5,546,757 A * | 8/1996 | Whipple, III ................ 62/225 |
| 5,586,441 A | 12/1996 | Wilson et al. |
| 5,597,117 A | 1/1997 | Watanabe et al. |
| 5,598,715 A | 2/1997 | Edmisten |
| 5,615,560 A | 4/1997 | Inoue |
| 5,622,055 A | 4/1997 | Mei et al. |
| 5,622,057 A | 4/1997 | Bussjager et al. |
| 5,634,355 A | 6/1997 | Cheng et al. |
| 5,642,858 A * | 7/1997 | Kakehashi et al. ....... 236/92 B |
| 5,651,258 A | 7/1997 | Harris |
| 5,678,417 A | 10/1997 | Nigo et al. |
| 5,689,962 A | 11/1997 | Rafalovich |
| 5,692,387 A | 12/1997 | Alsenz et al. |
| 5,694,782 A | 12/1997 | Alsenz |
| 5,706,665 A | 1/1998 | Gregory |
| 5,706,666 A | 1/1998 | Yamanaka et al. |
| 5,743,100 A | 4/1998 | Welguisz et al. |
| 5,752,390 A | 5/1998 | Hyde |
| 5,765,391 A | 6/1998 | Lee et al. |
| 5,806,321 A | 9/1998 | Bendtsen et al. |
| 5,813,242 A | 9/1998 | Lawrence et al. |
| 5,826,438 A | 10/1998 | Ohishi et al. |
| 5,839,505 A | 11/1998 | Ludwig et al. |

| | | | | | |
|---|---|---|---|---|---|
| 5,842,352 A | 12/1998 | Gregory | 5,987,916 A | 11/1999 | Egbert |
| 5,845,511 A | 12/1998 | Okada et al. | 6,092,733 A * | 7/2000 | Watanabe et al. ......... 236/92 B |
| 5,850,968 A | 12/1998 | Jokinen | 6,241,157 B1 * | 6/2001 | Yano et al. ............... 236/92 B |
| 5,862,676 A | 1/1999 | Kim et al. | 6,318,118 B2 | 11/2001 | Hanson et al. |
| 5,867,998 A | 2/1999 | Guertin | | | |
| 5,887,651 A | 3/1999 | Meyer | | | |
| 5,964,099 A | 10/1999 | Kim | | | |

* cited by examiner

FIG.1
FIG.2
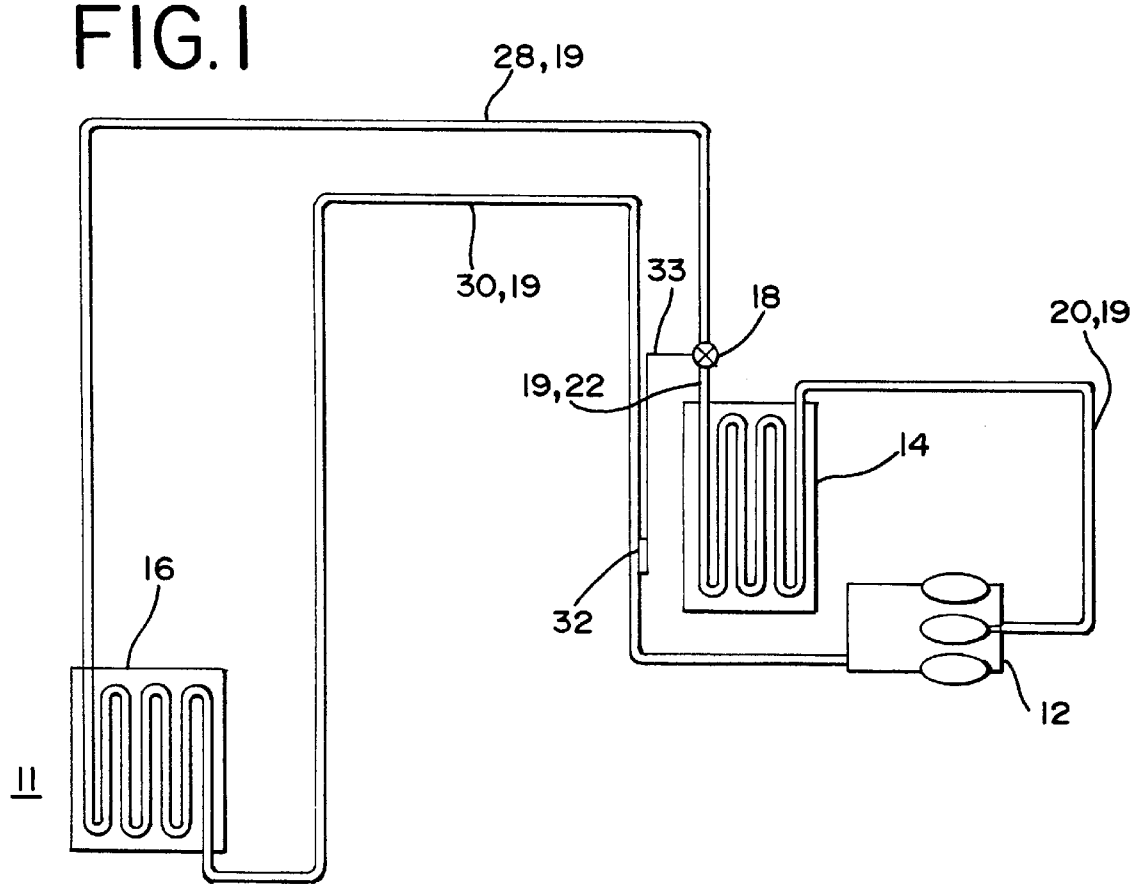
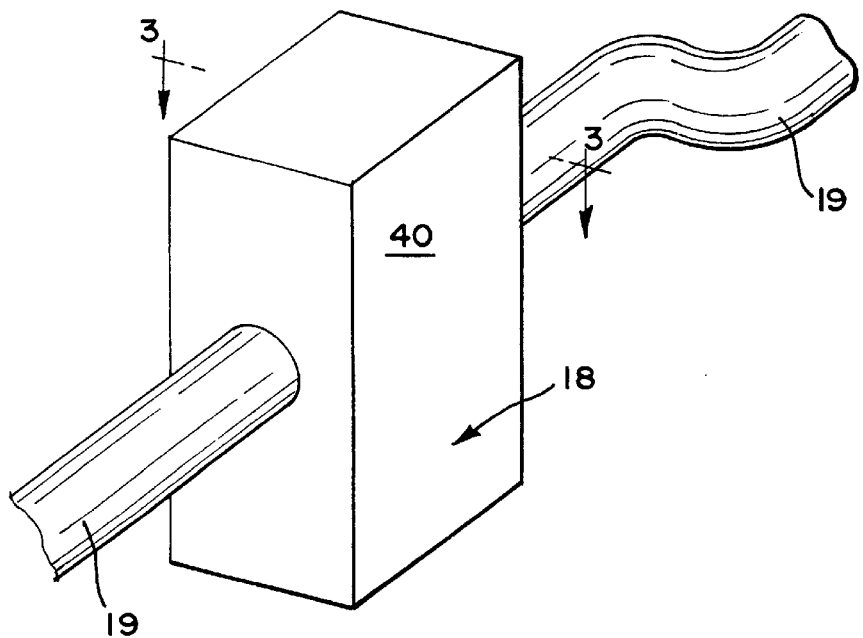

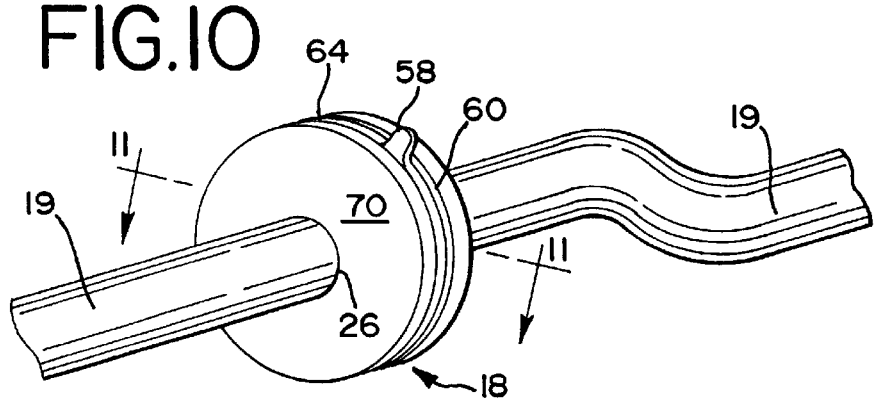
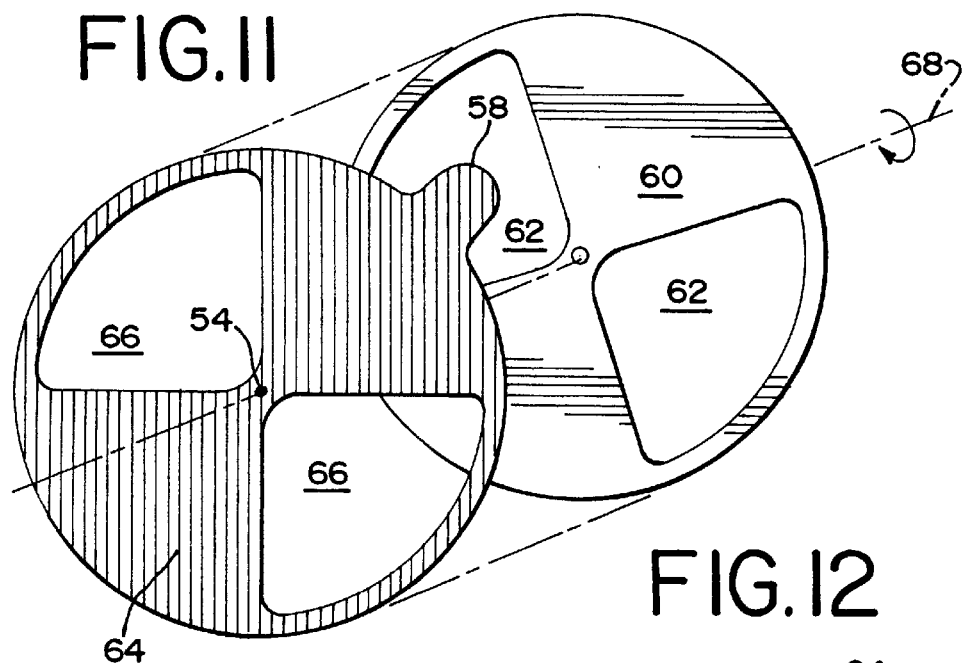
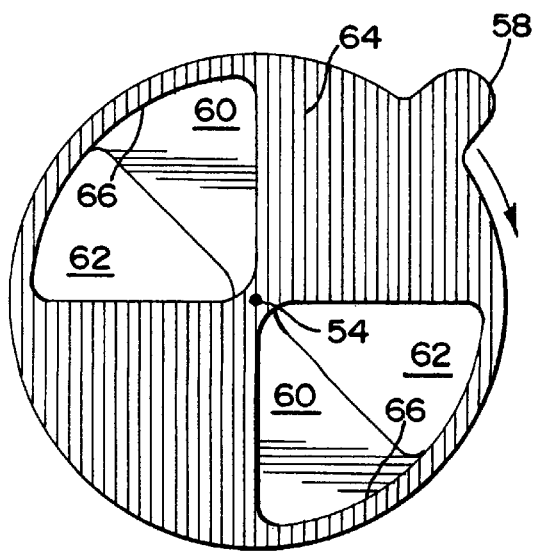

ively. The heat transfer fluid is volumetrically expanded when the heat transfer fluid flows through an expansion device, such as a thermostatic expansion valve, a capillary tube, and a pressure control, or when the heat transfer fluid flows through a nozzle or fixed orifice. Often times, the rate in which a heat transfer fluid is volumetrically expanded needs to be varied depending on the conditions within the vapor compression system. Devices such as capillary tubes, pressure controls, nozzles, or fixed orifices, are fixed in size and cannot vary the rate in which a heat transfer fluid is volumetrically expanded. While many thermostatic expansion valves can vary the rate in which a heat transfer fluid is volumetrically expanded, they are complex and rather costly to manufacture.

Accordingly, further development of vapor compression systems, and more specifically, expansion devices for vapor compression systems, is necessary in order to decrease the complexity and cost of manufacturing expansion devices that can vary the rate in which a heat transfer fluid is volumetrically expanded.

SUMMARY

According to one aspect of the present invention, a vapor compression system is provided. The vapor compression system includes a line for flowing heat transfer fluid, a compressor connected with the line for increasing the pressure and temperature of the heat transfer fluid, a condenser connected with the line for liquefying the heat transfer fluid, and an expansion device connected with the line for expanding the heat transfer fluid. The expansion device includes a housing defining a first orifice, and at least one blade connected with the housing, wherein the blade is movable between a first position and a second position, wherein the first orifice is larger in the first position than in the second position. The vapor compression system also includes an evaporator connected with the line for transferring heat from ambient surroundings to the heat transfer fluid.

According to another aspect of the present invention, an expansion device for a vapor compression system is provided. The expansion device includes a housing defining a first orifice, and at least one blade connected with the housing, wherein the blade is movable between a first position and a second position, wherein the first orifice is larger in the first position than in the second position.

According to yet another aspect of the present invention, an expansion device for a vapor compression system is provided. The expansion device includes a first sheet defining a first orifice, and a second sheet overlapping the first sheet, the second sheet defining a second orifice, wherein the second orifice is movable between a first position and a second position, and wherein the second orifice is larger in the first position than in the second position.

BRIEF DESCRIPTION OF THE DRAWINGS

FIG. 1 is a schematic drawing of a vapor compression system arranged in accordance with one embodiment of the invention;

FIG. 2 is a perspective view of an expansion device connected with a line, in accordance with one embodiment of the invention;

FIG. 10 is a perspective view of an expansion device connected with a line, in accordance with one embodiment of the invention;

FIG. 11 is an exploded perspective view of the expansion device in FIG. 9;

FIG. 12 is a cross-sectional view of the expansion device in FIG. 9, wherein the expansion device is in a partially open position;

Figure 3:
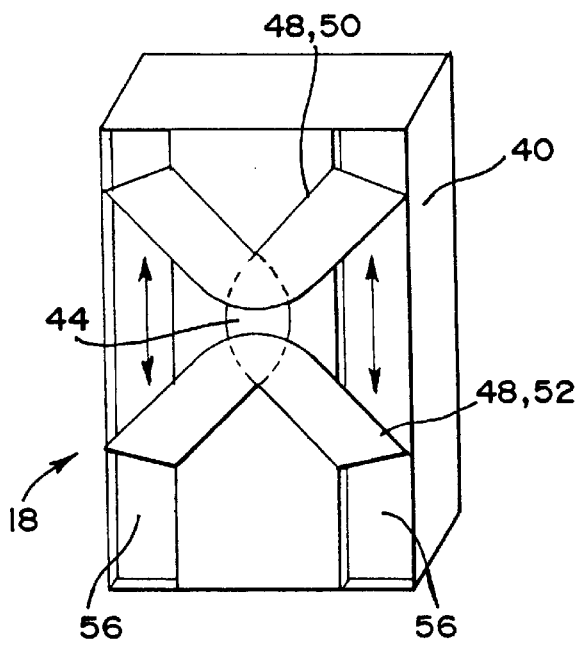
FIG. 3 is a cross-sectional perspective view of the expansion device in FIG. 2, wherein the expansion device is in a partially open position.

For simplicity and clarity of illustration, elements shown in the Figures have not necessarily been drawn to scale. For example, dimensions of some elements are exaggerated relative to each other. Further, when considered appropriate, reference numerals have been repeated among the Figures to indicate corresponding elements.

DETAILED DESCRIPTION OF THE PRESENTLY PREFERRED EMBODIMENTS

One embodiment of a vapor compression system 10 is illustrated in FIG. 1. Vapor compression system 10 includes a compressor 12 for increasing the pressure and temperature of a heat transfer fluid 34, a condenser 14 for liquefying the heat transfer fluid 34, an evaporator 16 for transferring heat from ambient surroundings to the heat transfer fluid 34, an expansion device 18 for expanding the heat transfer fluid 34, and a line 19 for flowing the heat transfer fluid. Line 19 allows for the flow of a heat transfer fluid 34 from one component of vapor compression system 10, such as compressor 12, condenser 14, evaporator 16, and expansion device 18, to another component of vapor compression system 10. Compressor 12, condenser 14, evaporator 16, and expansion device 18 are all connected with line 19. In one embodiment, line 19 includes discharge line 20, liquid line 22, saturated vapor line 28, and suction line 30, as illustrated in FIG. 1. In this embodiment, compressor 12 is connected with condenser 14 through discharge line 20, condenser 14 is connected with expansion device 18 through liquid line 22, expansion device 18 is connected with evaporator 16 through saturated vapor line 28, and evaporator 16 is connected with compressor 12 through suction line 30, as illustrated in FIG. 1.

In one embodiment, vapor compression system 10 includes a sensor 32 operably connected to expansion device 18. Sensor 32 can be used to vary the rate in which a heat transfer fluid 34 is volumetrically expanded through expansion device 18. Preferably, sensor 32 is mounted to a portion of line 19, such as suction line 30, and is operably connected to expansion device 18. Sensor 32 can be any type of sensor known by those skilled in the art designed to detect conditions in and around vapor compression system 10, such as the temperature, pressure, enthalpy, and moisture of heat transfer fluid 34 or any other type of conditions that may be monitored in and around vapor compression system 10. For example, sensor 32 may be a pressure sensor that detect the pressure of heat transfer fluid 34 at a certain point within vapor compression system 10, or sensor 32 may be a temperature sensor which detects the temperature of ambient surroundings 11 around vapor compression system 10. Preferably, sensor 32 is operably connected to expansion device 18 through control line 33.

Vapor compression system 10 can utilize essentially any commercially available heat transfer fluid 34 including refrigerants such as, for example, chlorofluorocarbons such as R-12 which is a dicholordifluoromethane, R-22 which is a monochlorodifluoromethane, R-500 which is an azeotropic refrigerant consisting of R-12 and R-152a, R-503 which is an azeotropic refrigerant consisting of R-23 and R-13, and R-502 which is an azeotropic refrigerant consisting of R-22 and R-115. Vapor compression system 10 can also utilize heat transfer fluids 34 including, but not limited to, refrigerants R-13, R-113, 141b, 123a, 123, R-114, and R-11. Additionally, vapor compression system 10 can utilize heat transfer fluids 34 including hydrochlorofluorocarbons such as 141b, 123a, 123, and 124; hydrofluorocarbons such as R-134a, 134, 152, 143a, 125, 32, 23; azeotropic HFCs such as AZ-20 and AZ-50 (which is commonly known as R-507); and blended refrigerants such as MP-39, HP-80, FC-14, R-717, and HP-62 (commonly known as R-404a). Accordingly, it should be appreciated that the particular heat transfer fluid 34 or combination of heat transfer fluid 34 utilized in the present invention is not deemed to be critical to the operation of the present invention since this invention is expected to operate with a greater system efficiency with virtually all heat transfer fluids 34 than is achievable by any previously known vapor compression system utilizing the same heat transfer fluid 34.

In one embodiment, compressor 12 compresses heat transfer fluid 34, to a relatively high pressure and temperature. The temperature and pressure to which heat transfer fluid 34 is compressed by compressor 12 will depend upon the particular size of vapor compression system 10 and the cooling load requirements of vapor compression system 10. Compressor 12 then pumps heat transfer fluid 34 into discharge line 20 and into condenser 14. In condenser 14, a medium such as air, water, or a secondary refrigerant is blown past coils within condenser 14 causing the pressurized heat transfer fluid 34 to change to a liquid state. The temperature of the heat transfer fluid 34 drops as the latent heat within the heat transfer fluids 34 is expelled during the condensation process. Condenser 14 discharges the liquefied heat transfer fluid 34 to liquid line 22.

As shown in FIG. 1, liquid line 22 discharges the heat transfer fluid 34 into expansion device 18 whereupon the heat transfer fluid 34 undergoes a volumetric expansion. In one embodiment, the heat transfer fluid discharged by condenser 14 enters expansion device 18 and undergoes a volumetric expansion at a rate determined by the conditions of suction line 30, such as temperature and pressure, at sensor 32. Sensor 32 relays information about the conditions of suction line, such a pressure and temperature, through control line 33 to expansion device 18. Upon undergoing a volumetric expansion, expansion device 18 discharges the heat transfer fluid 34 as a saturated vapor into saturated vapor line 28. Saturated vapor line 28 connects the expansion device 18 with the evaporator 16. Evaporator 16 transfers heat from ambient surroundings 11 to the heat transfer fluid 34. Ambient surroundings 11 is the atmosphere surrounding vapor compression system 10, as illustrated in FIG. 1. Upon exiting evaporator 16, heat transfer fluid then travels through suction line 30 back to compressor 12.

While in the above embodiment expansion device 18 is connected with saturated vapor line 28 and liquid line 22, expansion device 18 may connected with any component within vapor compression system 10 and expansion device 18 may be located at any point within vapor compression system 10. Preferably, expansion device 18 is located at a point within vapor compression system 10 in which it is desired to volumetrically expand heat transfer fluid 34, such as between condenser 14 and evaporator 16. More preferably, expansion device 18 is located at a point within vapor compression system 10 in which it is desired to vary the rate in which a heat transfer fluid 34 is volumetrically expanded, such as between condenser 14 and evaporator 16, as illustrated in FIG. 1. Expansion device 18 may be used in place of or in combination with metering devices such as, but not limited to, a thermostatic expansion valve, a capillary tube, a pressure control, a nozzle, and a fixed orifice. Preferably, heat transfer fluid 34 is volumetrically expanded when the heat transfer fluid 34 flows through expansion device 18.

Figure 4:
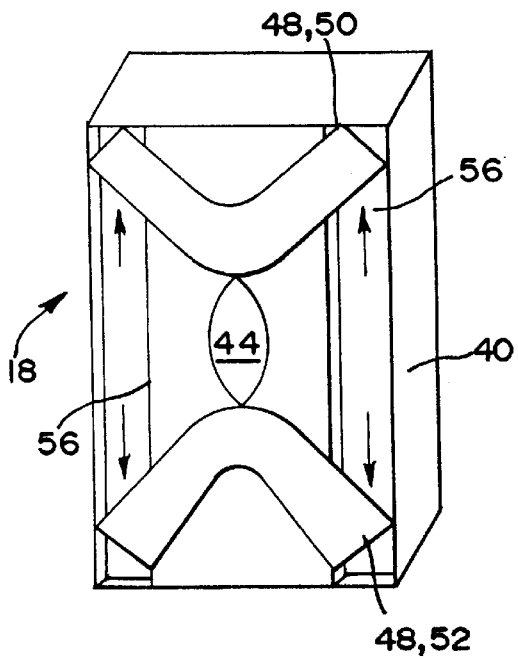
FIG. 4 is a cross-sectional perspective view of the expansion device in FIG. 2, wherein the expansion device is in a fully open position.
Figure 5:
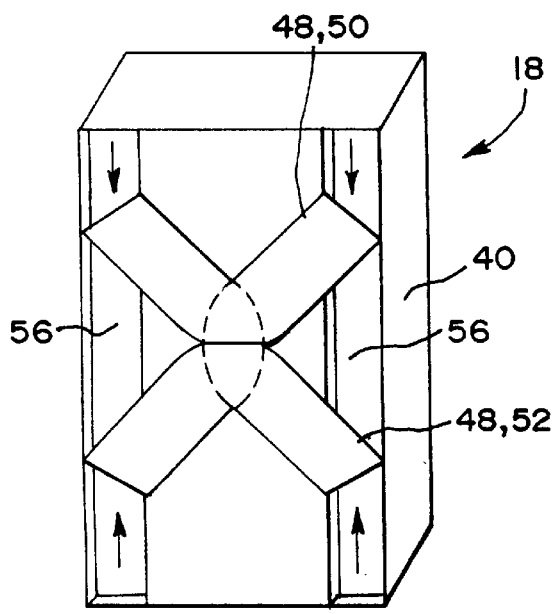
FIG. 5 is a cross-sectional perspective view of the expansion device in FIG. 2, wherein the expansion device is in a fully closed position.
Figure 6:
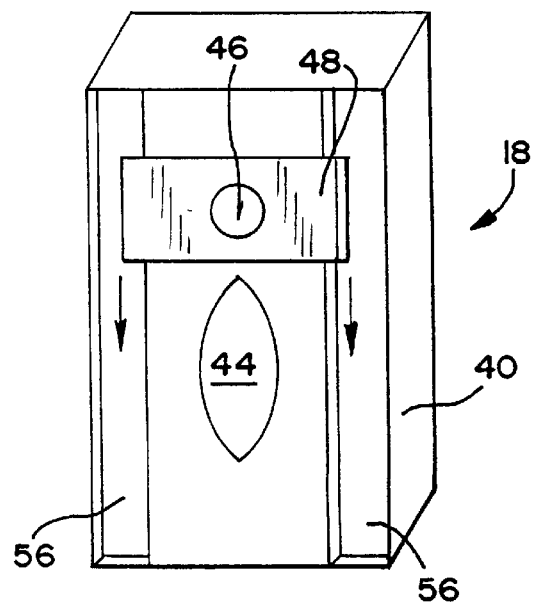
FIG. 6 is a cross-sectional perspective view of an expansion device, in accordance with one embodiment of the invention.
Figure 7:
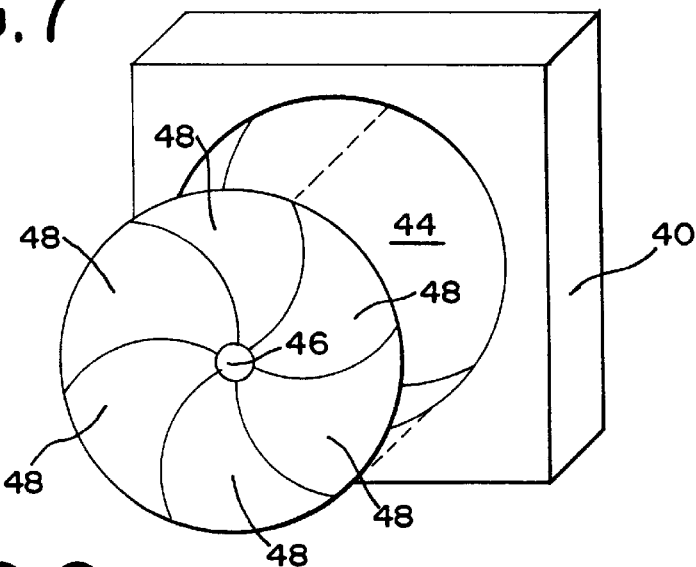
FIG. 7 is a cross-sectional perspective view of an expansion device, wherein the expansion device is in a closed position, in accordance with one embodiment of the invention.
Figure 8:
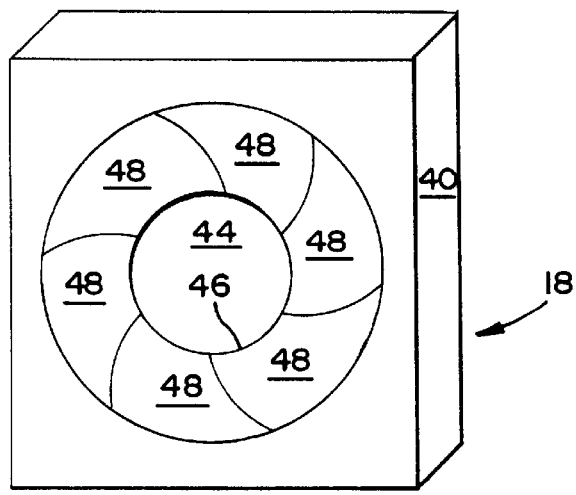
FIG. 8 is a cross-sectional perspective view of the expansion device in FIG. 6, wherein the expansion device is in a partially open position.
Figure 9:
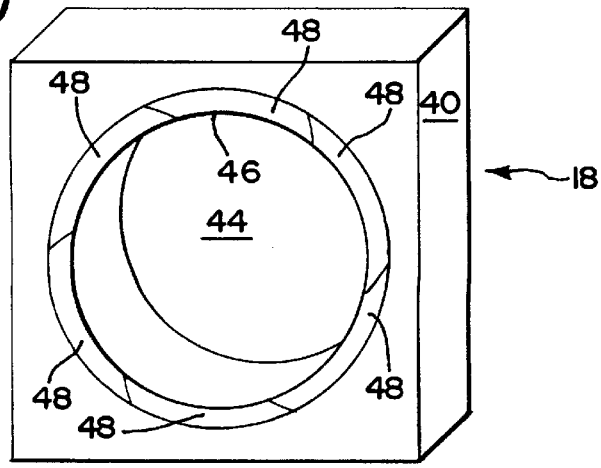
FIG. 9 is a cross-sectional perspective view of the expansion device in FIG. 6, wherein the expansion device is in a fully open position.
Figure 13:
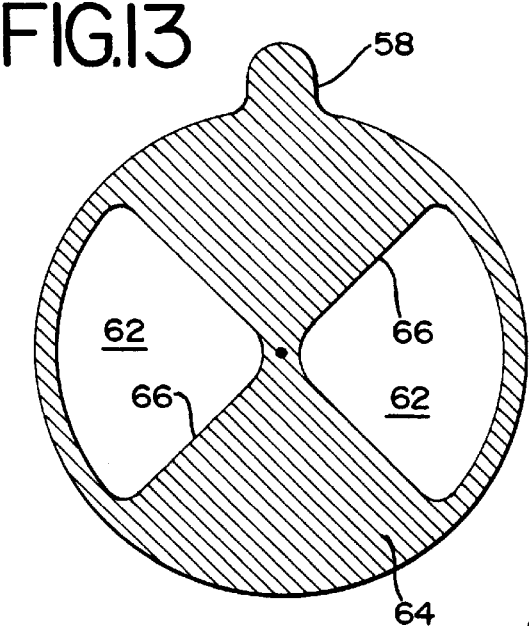
FIG. 13 is a cross-sectional view of the expansion device in FIG. 9, wherein the expansion device is in a fully open position.
Figure 14:
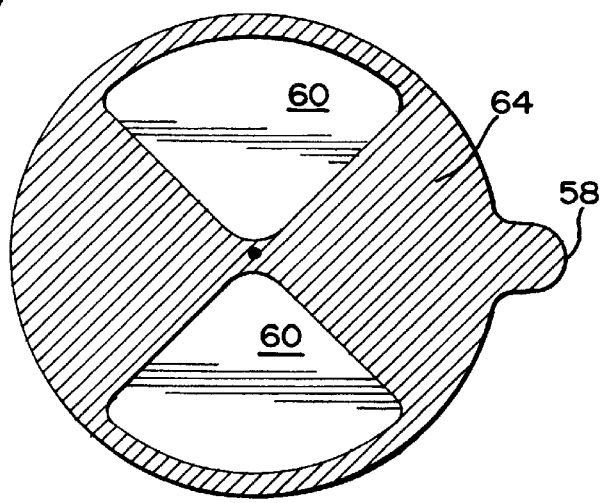
FIG. 14 is a cross-sectional view of the expansion device in FIG. 9, wherein the expansion device is in a fully closed position.

Shown in FIG. 2 is a perspective view of expansion device 18 connected with line 19, in accordance with one embodiment. Expansion device 18 includes a housing 40 and at least one blade 48, as illustrated in FIGS. 3–8. Housing 40 defines a first orifice 44. Preferably, housing 40 is manufactured from and includes a rigid, steel material, however housing 40 can be manufactured from any material known by those skilled in the art, such as ceramics, carbon fiber, any metal or metallic alloy, any plastic, or any other material. As defined herein, an orifice, such as first orifice 44, is any opening in which fluid, such as heat transfer fluid 34, can pass through. Orifice may have one of many shapes, such as a circular shape (as illustrated in FIGS. 7–9), a tear dropped shape, an eye shape (as illustrated in FIGS. 3–6), a square or rectangular shape, or any irregular shape. Blade 48 is connected with housing 40. Preferably, blade 48 is connected to housing 40, as illustrated in FIGS. 3–8. In one embodiment, blade 48 is connected to at least one track 56 within housing 40, wherein track 56 defines a path upon which blade 48 travels. Blade 48 may have one of many shapes, such as a circular shape or disc shape, a V shape (as illustrated in FIGS. 3–5), a curved shape (as illustrated in FIGS. 7–9), a square or rectangular shape (as illustrated in FIG. 6), or any irregular shape. Blade 48 includes and is manufactured from any material known by those skilled in the art, such as ceramics, carbon fiber, any metal or metallic alloy, any plastic, or any other material. Preferably, blade 48 includes and is manufactured from spring steel.

Blade 48 is movable between a first position, as illustrated in FIG. 4, and a second position, as illustrated in FIGS. 3 and 5, wherein the first orifice 44 is larger in the first position than in the second position. Blade 48 can be either manually moved from a first position to a second position or automatically moved, by means of a motor or other means, from a first position to a second position. As defined herein, an orifice, such as orifice 44, is made larger when the cross-sectional area of the orifice is effectively increased and an orifice is made smaller when the cross-sectional area of the orifice is effectively decreased, as illustrated in FIGS. 3–5. By increasing or decreasing the cross-sectional areas of an orifice, such as orifice 44, the rate of volumetric expansion within a heat transfer fluid 34 can be controlled and varied. Preferably, blade 48 overlaps a at least a portion of the first orifice when blade 48 is in the second position, thereby making the first orifice smaller.

In one embodiment, expansion device 18 includes a first blade 50 and a second blade 52, as illustrated in FIGS. 3–5. Preferably, first and second blades 50, 52 are connected to housing 40, as illustrated in FIGS. 3–8. In one embodiment, first and second blades 50, 52 are connected to at least one track 56 within housing 40, wherein track 56 defines a path upon which first and second blades 50, 52 travel. First blade 50 and second blade 52 are movable between a first position and a second position, wherein the first orifice 44 is larger in the first position than in the second position, as illustrated in FIGS. 3–5.

In one embodiment, expansion device includes a single blade 48, wherein single blade 48 defines a second orifice 46, as illustrated in FIG. 6. Preferably, second orifice 46 is adjacent first orifice 44. Blade 48 is movable between a first position and a second position, wherein the first orifice is larger in the first position than in the second position. By moving blade 48 between a first and second position, second orifice 46 overlaps with portions of first orifice 44, and first orifice 44 can be made larger or smaller.

In one embodiment expansion device 18 includes a series of blades 48, wherein the series of blades 48 define a second orifice 46, as illustrated in FIGS. 7–9. Second orifice 46 overlaps first orifice 44. Preferably, second orifice 46 is adjacent first orifice 44. Blades 48 are movable between a first position and a second position, wherein the second orifice 46 is larger in the first position than in the second position. By moving blades 48 between a first and second position, second orifice 46 can be made larger or smaller. Since second orifice 46 overlaps first orifice 44, first orifice 44 can be made larger or smaller as second orifice 46 is made larger or smaller. In one embodiment, the series of blades 48 define a second orifice 46 that is generally circular, as illustrated in FIGS. 7–9. In this embodiment, the series blades 48 are arranged in a formation that resembles the aperture of a camera lens.

In one embodiment, sensor 32 controls the movement of at least one blade 48 between a first position a second position. Preferably, sensor is connected with a moving device (not shown), such as an electric motor or an electromagnet, wherein the moving device can be used to automatically move blade 48 from a first position to a second position upon receiving a signal from sensor 32.

In one embodiment, expansion device 18 includes a first sheet 60 defining a first orifice 62, and a second sheet 62 overlapping the first sheet 60, as illustrated in FIGS. 10–15. First sheet 60 and second sheet 64 can be manufactured from and include any material known by those skilled in the art, such as ceramics, carbon fiber, any metal or metallic alloy, any plastic, or any other material. Preferably, first sheet 60 and second sheet 64 are manufactured from and include ceramic material. First sheet 60 and second sheet 64 may have one of many shapes, such as a circular shape or disc shape (as illustrated in FIGS. 3–5), a V shape, a curved shape, a square or rectangular shape, or any irregular shape. Second sheet 64 defines a second orifice 66, wherein the second orifice 66 is movable between a first position and a second position, and wherein the second orifice is larger in the first position than in the second position. In one embodiment, at least one of first sheet 60 and second sheet 64 rotate about a common axis 68, as illustrated in FIG. 11. Preferably, the common axis 68 is generally centered on first sheet 60 and second sheet 64. In one embodiment, first sheet 60 is fixed with respect to a housing 70, and second sheet 64 rotates about a common axis 68, wherein axis 68 is located at the center of bother first sheet 60 and second sheet 64, as illustrated in FIG. 10. Preferably, expansion device 18 includes a tab 58 protruding from housing 70 and connected with second sheet 64, wherein tab 58 allows for one to manually move second sheet 64 from a first position to a second position.

Preferably, heat transfer fluid 34 is used to lubricate either blades 48 or first and second sheets 60, 64, so that blades 48 and/or first and second sheets 60, 64 may move more freely about.

Figure 15:
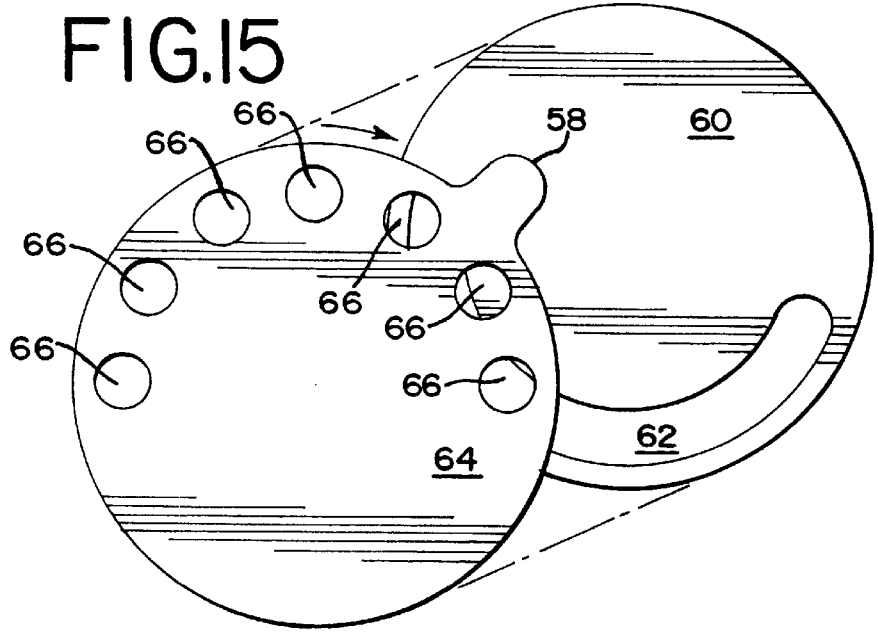
FIG. 15 is an exploded perspective view of an expansion device, in accordance with one embodiment of the invention.

In one embodiment, second sheet 64 defines multiple orifices 66 and first sheet 60 defines a single orifice 62, wherein the size and shape of orifice 62 allows orifice 62 to overlap multiple orifices 66, as illustrated in FIG. 15. Multiple orifices 66 are movable between a first position and a second position, wherein the single orifice overlaps the multiple orifices in the second position, and wherein the single orifice 62 is made larger as the multiple orifices move to the second position, as illustrated in FIG. 15.

Expansion device 18 may be combined with a traditional expansion device, wherein the traditional expansion device volumetrically expands heat transfer fluid 34 at a fixed rate. By combining expansion device 18 with a traditional expansion device, heat transfer fluid 34 can be volumetrically expanded at a varied rate, and thus simulate the effect of a thermostatic expansion valve, at a reduced cost.

Those skilled in the art will appreciate that numerous modifications can be made to enable vapor compression system 10 to address a variety of applications. For example, vapor compression system 10 operating in a retail food outlet may include a number of evaporators 16 that can be serviced by a common compressor 12. Also, in applications requiring refrigeration operations with high thermal loads, multiple compressors 12 can be used to increase the cooling capacity of the vapor compression system 10.

Those skilled in the art will recognize that vapor compression system 10 can be implemented in a variety of configurations. For example, the compressor 12, condenser 14, expansion device 18, and the evaporator 16 can all be housed in a single housing and placed in a walk-in cooler. In this application, the condenser 14 protrudes through the wall of the walk-in cooler and ambient air outside the cooler is used to condense the heat transfer fluid 34. In another application, vapor compression system 10 can be configured for air-conditioning a home or business. In yet another application, vapor compression system 10 can be used to chill water. In this application, the evaporator 16 is immersed in water to be chilled. Alternatively, water can be pumped through tubes that are meshed with the evaporator coil 44. In a further application, vapor compression system 10 can be cascaded together with another system for achieving extremely low refrigeration temperatures. For example, two vapor compression systems using different heat transfer fluids 34 can be coupled together such that the evaporator of a first system provides a low temperature ambient. A condenser of the second system is placed in the low temperature ambient and is used to condense the heat transfer fluid in the second system.

As known by one of ordinary skill in the art, every element of vapor compression system 10 described above, such as evaporator 16, liquid line 22, and suction line 30, can be scaled and sized to meet a variety of load requirements. In addition, the refrigerant charge of the heat transfer fluid in vapor compression system 10, may be equal to or greater than the refrigerant charge of a conventional system.

Thus, it is apparent that there has been provided, in accordance with the invention, a vapor compression system that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. For example, non-halogenated refrigerants can be used, such as ammonia, and the like can also be used. It is therefore intended to include within the invention all such variations and modifications that fall within the scope of the appended claims and equivalents thereof.

What is claimed is:

1. A vapor compression system comprising:
    a line for flowing heat transfer fluid;
    a compressor connected with the line for increasing the pressure and temperature of the heat transfer fluid;
    a condenser connected with the line for liquefying the heat transfer fluid;
    an expansion device connected with the line for expanding the heat transfer fluid, comprising:
        a housing defining a first orifice;
        at least one blade connected with the housing, wherein the blade is movable between a first position and a second position, wherein the first orifice is larger in the first position than in the second position; and
    an evaporator connected with the line for transferring heat from ambient surroundings to the heat transfer fluid.

2. The vapor compression system of claim 1, further comprising a first blade and a second blade, wherein the first blade and second blade are movable between a first position and a second position, wherein the first orifice is larger in the first position than in the second position.

3. The vapor compression system of claim 1, wherein the blade defines a second orifice.

4. The vapor compression system of claim 1, further comprising a series of blades, wherein the series of blades define a second orifice adjacent the first orifice, and wherein the blades are movable between a first position and a second position, wherein the second orifice is larger in the first position than in the second position.

5. The vapor compression system of claim 3, wherein the second orifice is generally circular.

6. The vapor compression system of claim 1, wherein the blade is generally disc-shaped.

7. The vapor compression system of claim 1, wherein the blade comprises ceramic material.

8. The vapor compression system of claim 1, further comprising a sensor connected with the expansion device.

9. The vapor compression system of claim 8, wherein the sensor controls the movement of the blade between the first position and the second position.

10. An expansion device for a vapor compression system, comprising:
    a housing defining a first orifice;
    at least one blade connected with the housing, wherein the blade is movable between a first position and a second position, wherein the first orifice is larger in the first position than in the second position.

11. The expansion device of claim 10, wherein the blade overlaps at least a portion of the first orifice when the blade is the second position.

12. The expansion device of claim 10, further comprising a first blade and a second blade, wherein the first blade and second blade are movable between a first position and a second position, wherein the first orifice is larger in the first position than in the second position.

13. The expansion device of claim 10, further comprising a series of blades, wherein the blades define a second orifice adjacent the first orifice, and wherein the blades are movable between a first position and a second position, wherein the second orifice is larger in the first position than in the second position.

14. The expansion device of claim 13, wherein the second orifice is generally circular.

15. The expansion device of claim 10, wherein the blade defines a second orifice.

* * * * *